UNITED STATES PATENT OFFICE.

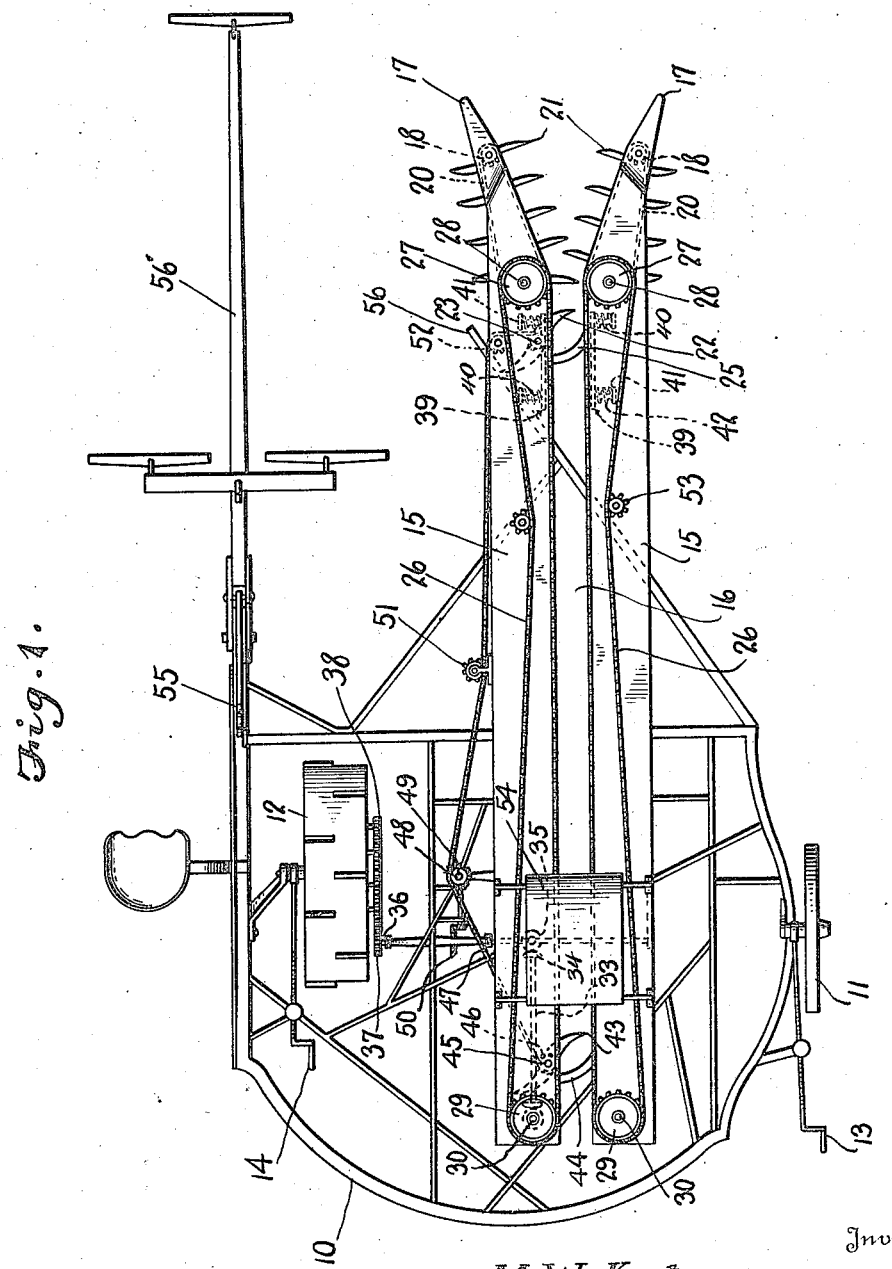

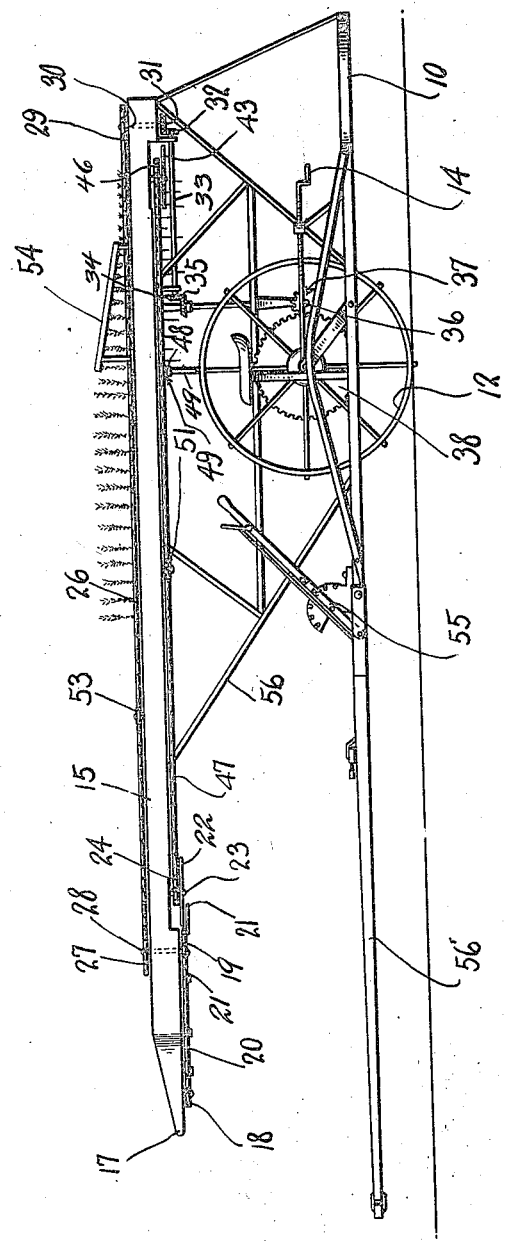

MAT W. KESTERSON, OF GOREE, AND JAMES H. LATIMER, OF WEINERT, TEXAS.

HEADER.

1,424,648.    Specification of Letters Patent.    Patented Aug. 1, 1922.

Application filed December 22, 1919. Serial No. 346,731.

*To all whom it may concern:*

Be it known that we, MAT W. KESTERSON and JAMES H. LATIMER, citizens of the United States, residing at Goree and Weinert, in the counties of Knox and Haskell and State of Texas, have invented new and useful Improvements in Headers, of which the following is a specification.

This invention relates to grain headers, especially adapted for use in heading maize, Kafir-corn, sorghum and the like.

The primary object of the invention is to provide a header for cutting the heads of the grain from the stalks, so as to leave approximately the same length of stalk (about three inches) upon each head, irrespective of the varying heights of the growing grain.

Another object of the invention is to provide for adjusting the machine to the proper approximate height of the grain, so that the length of the stalk upon the individual heads will not greatly vary.

Another object is to provide means for guiding the stalk to one side of the header, so that the former will not interfere with the proper operation of the machine.

Other objects and advantages will appear as the following description is read in connection with the accompanying drawings.

In the drawings:

Figure 1 is a top plan view of a header constructed in accordance with the present invention.

Figure 2 is a side elevation of the same.

The header shown in the accompanying drawings may be manufactured as a complete machine, or may be provided as an attachment for a machine used for other purposes, the invention residing in means employed for severing the heads of the grain from the stalks in an even manner. To accomplish this there is provided a body or frame 10, which may be of any desired construction, being supported upon wheels 11 and 12, which are adjustable to regulate the height of the body through the medium of levers 13 and 14, respectively. The wheel 12 is a traction wheel and is designed to supply power for operating the header mechanism. The header mechanism comprises a conveyor frame, which includes spaced parallel members 15, which are suitably supported upon the frame 10, so as to provide a guide channel 16. The forward ends of the members 15 extend outwardly at an angle to provide divergent ends 17, which are adapted to guide the heads of the grain into the channel 16. For this purpose each of the ends 17 carry sprockets 18 and 19, over which operate feed chains 20, the latter carrying oppositely and movably extending fingers 21, which are adapted to separate the grain and guide the same to the cutters. One of these cutters is located at the forward end of the channel 16 and includes revolving blades 22, which are mounted upon a vertical shaft 23, which also carries a sprocket wheel 24. These revolving knives act in conjunction with a stationary knife 25, which is positioned across the channel 16, both the knives 22 and 25 being curved to provide a shearing action for the purpose of severing the head of the grain from the stalk. The knives 22 and 25 are positioned directly beneath the members 15, while mounted upon the top of each of these members are conveyor chains 26. The chains 26 pass around sprockets 27, which are mounted upon the upper ends of shafts 28, which shafts also carry sprockets 19 of the chains 20 for the purpose of operating the latter. Located at the opposite ends of the members 15 are sprockets 29, which are mounted upon short shafts 30, extending vertically through the said members.

One of the shafts 30 carries at its lower end a beveled pinion 31, which engages and is driven by a similar pinion 32, mounted upon the end of the shaft 33, which extends longitudinally of the machine. The opposite end of the shaft 33 carries a pinion 34, which is driven by a pinion 35, in turn, mounted upon a shaft which is driven by a horizontal shaft 36, extending transversely of the machine. This shaft carries a spur pinion 37, which is driven by a gear 38 secured to the traction wheel 12. By this means the heads of the grain entering the channel 16 will be conveyed from the forward end of the channel by the gripping action of the chains 26, to the rear of the machine, where they may be deposited into a suitable trailer.

In order to tightly grip the heads between the chains 26, and to hold them in an upright position during the action of the knives 22 and 25, there is provided yieldingly mounted longitudinally disposed re-inforcing elements 39, which are mounted upon rods 40, movable in bearings 41, carried by the members 15. Springs 42 are positioned upon the rods 41, between the elements 39 and the bearings 40 to provide this yielding action. Located at the rear end of the channel 16, is an additional cutter, which consists of revolving knives 43 and a stationary knife 44, similar in construction and operation to the cutter previously described. The knives 43 are mounted upon a short shaft 45, which also carries a sprocket 46, the latter being connected to the sprocket 24 through the medium of a chain 47. This chain passes over a sprocket wheel 48, which is mounted upon a vertical shaft 49 and is driven through the medium of beveled gears 50 from the shaft 36. The chain 47 passes around idlers 51 and 52, one of which may be adjustable to take up slack in the chain. Other idlers 53 may be mounted upon the upper faces of the members 15 in the chains 26.

Suitably spaced above and positioned across the channel 16 immediately in advance of the knives 43 and 44, is an inclined pusher board 54, the purpose being to regulate the height of the tops of the heads of the grain so that they will all pass over the knives 43 and 44 at approximately the same height. By this means the heads of the taller grain which have been cut by the forward knives, with stalks of a greater length than those left on the heads of the shorter grain, will have the excess portion of the stalks removed, so that the heads after passing through the channel 16 will all have approximately the same length of stalk.

It will be seen from the foregoing description and the accompanying drawings that the grain entering between the ends 17 of the members 15 will be directed to the knives 22 and 25, which will sever the heads from the stalks and the former will be conveyed through the medium of the chains 26 to the rear of the machine, the heads of the taller grain coming in contact with the inclined pusher board 54, so as to bring the stalks into position for the removal of their excess lengths by the knives 43 and 44.

Carried by the frame or body 10, is an arm 56, which extends upwardly and at an angle beneath the members 15 and across the channel 16 at the rear of the knives 22 and 25. This arm is positioned in the path of the stalks of the grain after the grain has been removed and guides the said stalks to one side of the conveyor frame.

The machine may be adjusted to approximately the proper height of the grain through the medium of a lever 55, which is positioned to the rear of the draft tongue 56'.

The invention is susceptible of various changes in its form, proportions and minor details of construction and the right is herein reserved to make such changes as properly fall within the scope of the appended claim. For example, the elements 39 may be duplicated at the rear end of the machine over the knives 43 and 44 and the idlers 53 omitted and other suitable means provided for tightening the chains 26, so that one or both of these chains may be provided with fingers similar to the fingers 21 of the chains 20, if found desirable.

Having described the invention, what is claimed is:

A grain heading machine comprising a wheel supported body, a conveyor frame mounted transversely of the latter and mounted thereon, a cutter located at the forward end of the conveyor frame for severing the head of the grain from the stalk, an inclined arm carried by the wheel supported body and extending upward beneath the conveyor frame at the rear of the cutter for guiding the stalk of the grain to one side of the conveyor frame, means for conveying the headed grain to the rear end of the machine, a cutter located at said rear end and means located in advance of the last mentioned cutter for causing all of the heads to pass the latter at a predetermined elevation.

In testimony whereof we affix our signatures.

MAT W. KESTERSON.
JAMES H. LATIMER.